United States Patent [19]

Conway

[11] Patent Number: 5,719,622
[45] Date of Patent: Feb. 17, 1998

[54] VISUAL CONTROL SELECTION OF REMOTE MECHANISMS

[75] Inventor: Lynn Conway, Jackson, Mich.

[73] Assignee: The Regents of the University of Michigan, Ann Arbor, Mich.

[21] Appl. No.: 606,052

[22] Filed: Feb. 23, 1996

[51] Int. Cl.$^6$ .......................... H04N 5/232; H04B 10/00
[52] U.S. Cl. .......................... 348/211; 348/212; 348/213; 359/142; 359/143; 359/144; 359/152; 340/531; 340/555; 340/556; 356/152
[58] Field of Search .......................... 358/402; 348/211, 348/169, 212, 213, 214, 143, 159, 13, 15; 359/142, 143, 144, 148, 159, 172, 152; 340/531, 555, 556, 557; 380/13, 15, 20

[56] References Cited

U.S. PATENT DOCUMENTS

| | | | |
|---|---|---|---|
| 3,984,628 | 10/1976 | Sharp | 348/211 |
| 4,280,135 | 7/1981 | Schlossberg . | |
| 4,503,506 | 3/1985 | Sturges, Jr. . | |
| 4,716,465 | 12/1987 | Meyer | 348/211 |
| 4,974,088 | 11/1990 | Sasaki | 348/211 |
| 5,045,843 | 8/1991 | Hansen . | |
| 5,049,988 | 9/1991 | Sefton et al. | 348/211 |
| 5,073,824 | 12/1991 | Vertin | 348/211 |
| 5,179,421 | 1/1993 | Parker et al. | 356/152 |
| 5,268,734 | 12/1993 | Parker et al. | 356/152 |
| 5,383,044 | 1/1995 | Borchardt et al. | 359/145 |
| 5,444,476 | 8/1995 | Conway . | |
| 5,465,144 | 11/1995 | Parker et al. | 356/139.06 |
| 5,517,300 | 5/1996 | Parker et al. | 356/139.06 |
| 5,528,289 | 6/1996 | Cortjens et al. | 348/211 |
| 5,561,519 | 10/1996 | Parker et al. | 348/169 |
| 5,598,209 | 1/1997 | Cortjens et al. | 348/211 |

*Primary Examiner*—Edward L. Coles, Sr.
*Assistant Examiner*—Mark Wallerson
*Attorney, Agent, or Firm*—Harness, Dickey & Pierce, P.L.C.

[57] ABSTRACT

An apparatus for selecting and controlling devices located remotely from a local site where an operator resides. A laser or other source of a focused electromagnetic beam moves in association with a camera located at the remote site. The camera thus can detect the object on which the focused laser beam projects. The camera outputs a video signal which is transmitted from the remote site to the local site. The operator at the local site views the video signal on a monitor so that the operator can determine the location of the laser beam. When the laser beam illuminates at least one particular transponder out of one or a plurality of transponders, the transponder outputs a signal to at least one device to activate or deactivate the device, thus providing the operator remote control of the device. A light may also be associated with the transponder and activates when the transponder has been selected to provide a positive indication to the operator that only the particular transponder has been selected. A remote controller may also be provided at the remote site to control operation of the particular, selected device of the plurality. The controller receives commands from the operator at the local site, thereby providing the operator with selection and control capabilities.

16 Claims, 5 Drawing Sheets

VISUAL CONTROL SELECTION OF REMOTE MECHANISMS

This invention relates generally to the use of video telecommunications to control remotely located devices. More particularly, this invention relates to the use of a remotely directed pointing device to select, operate, and control devices at a remote site.

BACKGROUND OF THE INVENTION

The availability of relatively inexpensive transmission of video signals has increased dramatically over the last few years. Specifically, many phone and cable television companies have been allowed by the Federal Communications Commission (FCC) to install bundled telephone and cable television systems using the most recent technologies, typically fiber optic cables. With the proliferation of such systems and the bundling of telephone and video communications, it is readily apparent that in the near future traditional audio telephone communications will most likely migrate towards audio/video communications systems. Such audio/video communications systems will typically have an operator at a site receiving audio and video signals so that the operator may both view and listen to what occurs at a remote site, and vise versa for an operator at the opposite site.

Simple audio/video communication systems include merely fixed cameras and video monitors at at least one and often both sites. A method and apparatus for controlling pointers in video images at remote sites from local sites is disclosed in U.S. Ser. No. 07/989,126, filed Dec. 11, 1992, entitled System and Method for Teleinteraction, now U.S. Pat. No. 5,444,476, issued Aug. 22, 1995, assigned to the Assignee of the present invention and herein incorporated by reference. A method and apparatus for controlling remote devices using a visual information stream may be found with reference to U.S. Ser. No. 08/404,886, filed Mar. 16, 1995, entitled Apparatus and Method for Remote Control Using a Visual Information Stream, assigned to the assignee of the present invention and also herein incorporated by reference. Improved systems may enable a operator to track around the room to enable the remote operator increased flexibility for viewing the remote site.

Some remote control systems include video capabilities of the type described above. The remote control systems enable the operator to visually scan the remote location and provide the operator with the capability of remotely operating devices as if the operator is actually in the room, rather than at the remote site. However, these systems are extremely expensive and usually are highly specialized, turn-key systems. These systems also often require expensive equipment such as robots which physically contact the controlled devices or require hardwired connections which transmit control signals to operate the controlled devices.

There also exists remote control systems which do not use video, but enable a user to communicate with particular devices remotely over phone lines. Typically, the operator initiates communication with the remote site over a phone line and enters commands through a computer and modem or through the touch tone pad of the phone to select and control devices. The system may or may not generate computer codes or confirmation tones to indicate to the operator that a command has been received. These systems lend themselves to controlling lights, appliances, entertainment centers, and almost any electronic device. These remote control systems do not, however, provide the user with any visual feedback that the desired, remotely controlled device has been selected. Nor do these systems provide any assurance that no other device has been inadvertently selected. Even with feedback from the system, however, the operator has no definite visual indication regarding which device was properly selected and controlled.

Thus, no remote control system combines a simple, inexpensive configuration of remote selection and control device with video capabilities so that the user can observe devices available for selection and operation and observe proper selection of a device. Further, no remote control system currently exists which may be easily adapted to a remote video system to enable the user to ascertain point to devices available for selection and control and receive visual feedback that the particular devices selected by the operator have indeed been selected. No simple, inexpensive remote selection and control system provides definitive visual feedback so as to give the operator the assurance that the device selected by the operator was indeed the targeted device.

Thus, it is desirable to provide a simple, inexpensive remote selection and control system which enables an operator to view a remote site and to select, and optionally control, particular devices.

SUMMARY OF THE INVENTION

A telecommunications system in which video images originate at a remote site and are displayed at a local site. The remote site includes at least one device which may be selected by an operator at the local site. The telecommunications system selects at least one of the devices at the remote site. A camera at the remote site may be oriented in a plurality of positions in accordance with control commands originating at the local site. A pointing device projects a focused electromagnetic signal and moves in accordance with the camera. The focused electromagnetic signal also provides a visual indication of the orientation of the pointing device, and the camera detects the visual indication so that the operator can determine the orientation of the pointing device. A signal detects the focused electromagnetic signal when directed thereon and generates an activation signal in response to detecting the electromagnetic signal. A controlled device is associated with the receiver and is actuated in accordance with the activation signal, where the controlled device is at least one of the above-mentioned devices. The operator selects the controlled device by directing the focused electromagnetic signal on the signal receiver.

Further objects, features and advantages of the invention will become apparent from a consideration of the following description and the appended claims when taken in connection with the accompanying drawings.

DETAILED DESCRIPTION OF THE DRAWINGS

Figure 1:
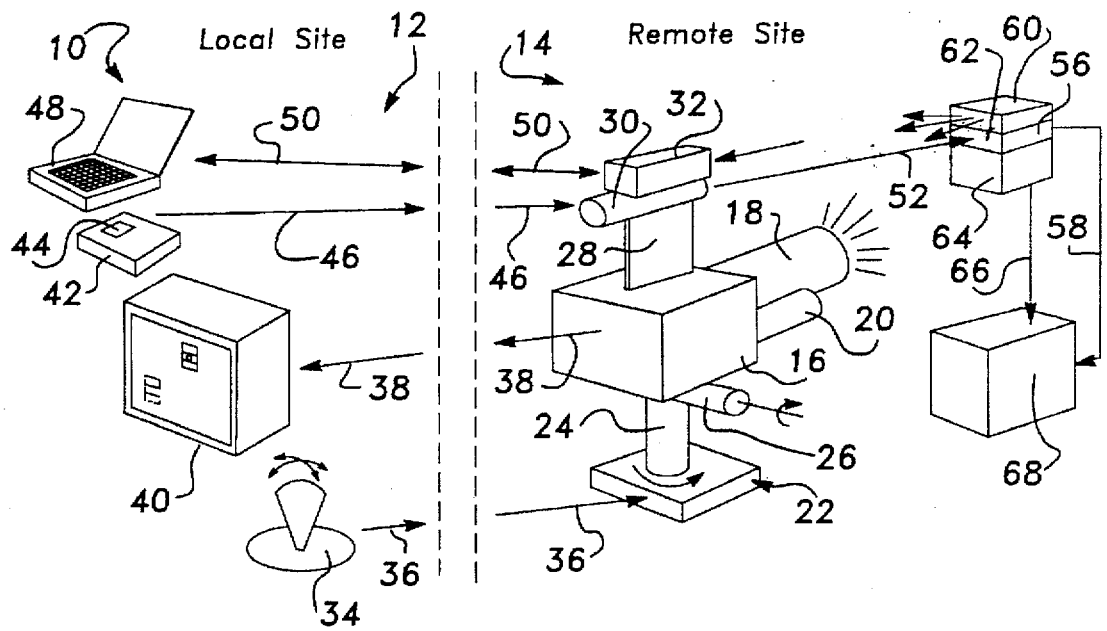
FIG. 1 depicts the visual control apparatus disclosed according to the principles of the present invention.

FIG. 1 depicts a diagram of the remote control selection system 10 arranged in accordance with the principles of this invention. The remote control selection system 10 includes a local site 12 and a remote site 14. By convention, local site 12 refers to the controlling site or the site where an operator resides and directs control of devices at remote site 14. Similarly, remote site 14 refers to the site having the controlled device or devices and where an operator may, but need not, be located. A camera 16 located at remote site 14 includes a lens 18 to capture video images and an optional microphone 20 to capture audio signals at remote site 14. Camera 16 mounts to a base 22 having an upwardly telescoping neck 24 which enables telescopic and rotational or panning movement of camera 16 and associated lens 18. Camera 16 may also tilt in a vertical direction about a swivel 26. Thus, camera 16 moves through three degrees of freedom about telescoping neck 24 and swivel 26 to scan substantially the entirety of the room. Base 22 may also attach to a stationary foundation, or in the alternative, to a moveable platform for translation over the surface on which it is positioned, to provide a fourth degree of freedom.

A pointer support 28 extends upwardly from camera 16. Pointer support 28 provides a mounting location for a laser pointer 30 which emits a focused signal embodied as electromagnetic radiation. In the invention described herein, the electromagnetic radiation comprises a laser beam and will be referred to throughout the specification as such. One skilled in the art will recognize that any of a number of various encodeable electromagnetic signals would readily substitute for the laser. Control transmitter 32 then mount on top of laser pointer 30. Control transmitter 32 emits and receives electromagnetic radiation, distinct from those signals emitted by laser pointer 30, to provide control commands to the devices following selection. In the invention described herein, control transmitter 32 emits and receives electromagnetic radiation in the form of infrared (IR) signals.

Movement of camera 16 is remotely directed by an operator at local site 12 by a joystick 34 or other directional device. Movement of the joystick 34 generates control signals which are transmitted to camera base 22 via control line 36. Movement of joystick 34 results in a corresponding pan, tilt, or telescoping motion of camera 16 about the telescoping neck 24 and/or swivel 26. The camera 16 outputs a signal transmitted from remote site 14 to local site 12 via audio/video line 38 which provides a signal for input to television or monitor 40. Monitor 40 displays the video image captured by lens 18 of camera 16. Camera 16 may also output an audio signal transmitted from remote site 14 to local site 12 via audio/video line 38. The audio signal transmitted represents the audio information captured by microphone 20. At local site 12, switch box 42 has a toggle switch 44 and outputs a signal on line 46 from local site 12 to remote site 14. The signal output by toggle switch 44 activates and deactivates laser pointer 30 so that laser pointer 30 outputs a focused laser beam when activated. A remote controller 48 located at local site 12 sends and receives specific device control information to and from control transmitter 32 on signal line 50.

In operation, when the user desires to select a device, the user closes the toggle switch 44 of switch box 42. Closing the toggle switch 44 activates the laser pointer 30 so that the laser pointer 30 projects a focused laser beam 52. Through operation of joystick 34, the operator varies the orientation of camera 16, the attached laser pointer 30, and control transmitter 32. The operator may view the monitor 40 in order to determine where the laser beam 52 points because the monitor 40 displays the scene captured by camera 16. Through manipulation of joystick 34, the operator guides the laser beam 52 to point at a transponder 56. When the laser beam 52 illuminates transponder 56, transponder 56 generates an output signal to the controlled device 68 on control line 58. The transponder 56 also generates an activation signal to a device select light 60 which is actuated when the laser beam 52 is directed to the face 62 of transponder 56. Activating device select light 60 provides visual feedback to the operator at local site 12 that the operator has selected transponder 56.

Transponder 56 also provides an enable signal to control receiver 64. Control receiver 64 receives the signal emitted by control transmitter 32 and decodes the received signal into a control signal for output on line 66 to the controlled device 68. The control commands generated by control transmitter 32 are input by the operator at remote controller 48 which sends and receives command and status information to and from control transmitter 32 on signal lines 50. Thus, after the operator has activated the laser pointer 30 using toggle switch 44 and illuminated the transponder 56, the operator may then control the controlled device 68 through remote controller 48. Control transmitter 32 generates electromagnetic signals encoded for receipt by control receiver 64. Control receiver 64 then decodes the signals into control commands applied to controlled device 68.

Figure 2:
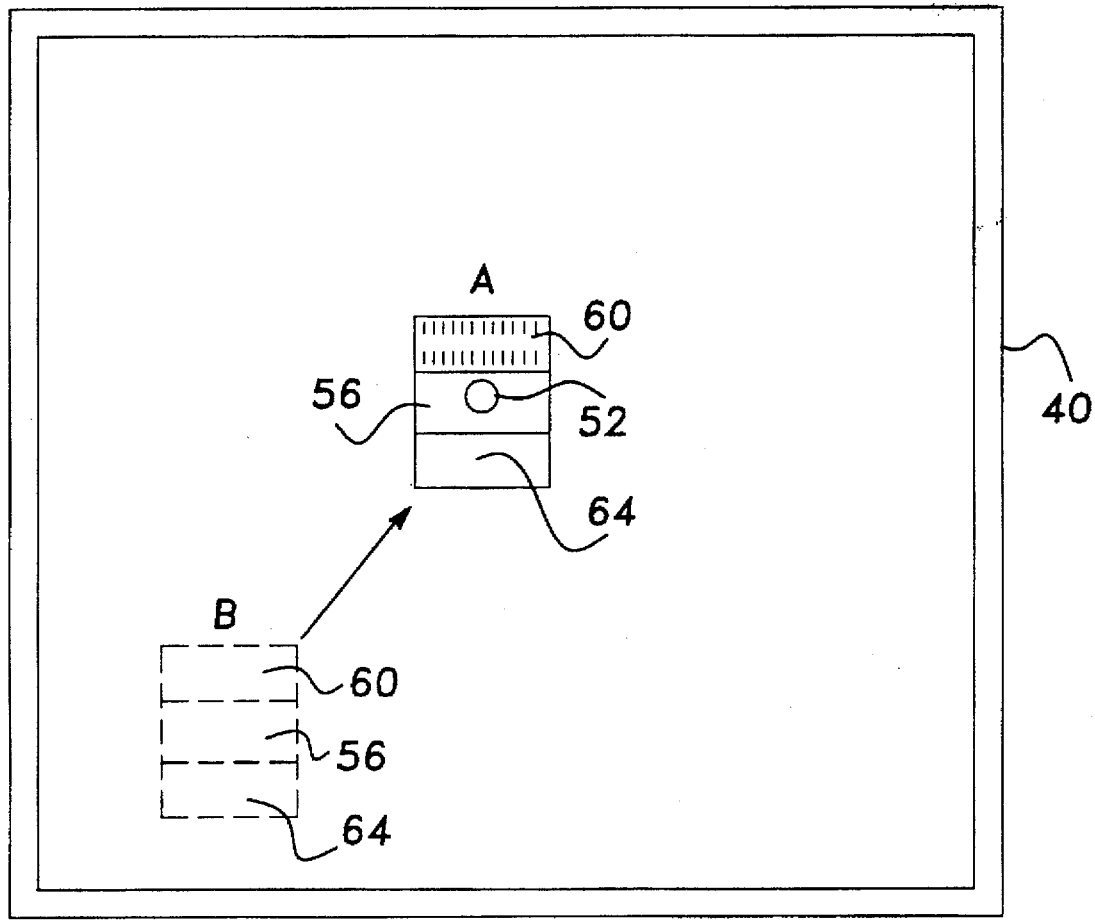
FIG. 2 depicts a visual representation of an exemplary image which appears on the monitor at the local site.

FIG. 2 depicts an exemplary image viewed by the operator at the local site 12 on monitor 40. Within the image of monitor 40, the laser beam 52 remains fixed in, for example, the center of the image. Because the laser pointer 30 is generally fixed with respect to the camera lens 18, the image of the position of laser beam 52 should remain fixed in a predetermined position in accordance with the orientation of the laser pointer 30 with respect to the camera lens 18. Thus, as the operator manipulates the joystick 34 to pan and tilt the camera 16, the laser pointer 30 moves accordingly as well, thereby maintaining the laser beam 52 at a substantially fixed position with respect to lens 18. Of course, it will be understood by one skilled in the art that the position of laser beam 52 on monitor 40 will be affected by the parallax caused by separation between the axis of the camera lens 18 and the axis of the laser beam 52.

FIG. 2 further depicts device select light 60, transponder 56, and control receiver 64, occupying a first position A, shown in phantom in the lower left section of monitor 40, and occupying a second position B in the center of monitor 40. The operator uses the joystick 34 to manipulate the camera 16 to reposition these devices within the monitor 40. For example, if the operator desires to select transponder 56 occupying at position A, the operator would manipulate joystick 34 so that the camera moves in the direction of transponder 56 at position A, translating transponder 56 toward position B in the center of monitor 40, as indicated by the arrow. By using joystick 34, the operator translates select light 60, transponder 56, and control receiver 64 from their initial position A in the lower left to position B in the center of monitor 40. At position B when the laser beam 52 strikes the transponder 56, device select light 60 illuminates, indicating to the operator has selected transponder 56b. When the laser beam 52 moves off transponder 56 at position A, transponder 56 is no longer selected.

In addition to the configuration of FIG. 2, where the transponder 56 for selection is readily visible, one skilled in the art will appreciate that transponder 56 need not be as readily visible on monitor 40. In specific instances requiring privacy or security, transponder 56 may be concealed within the background of the remote site so that the only an operator familiar with the remote site can select the concealed transponder. Selection of the concealed transponder may be acknowledged by activation of a device select light 60b. Optionally, one skilled in the art will appreciate that in certain instances, one may elect not to acknowledge selection to provide greater privacy and confidentiality.

Figure 3:
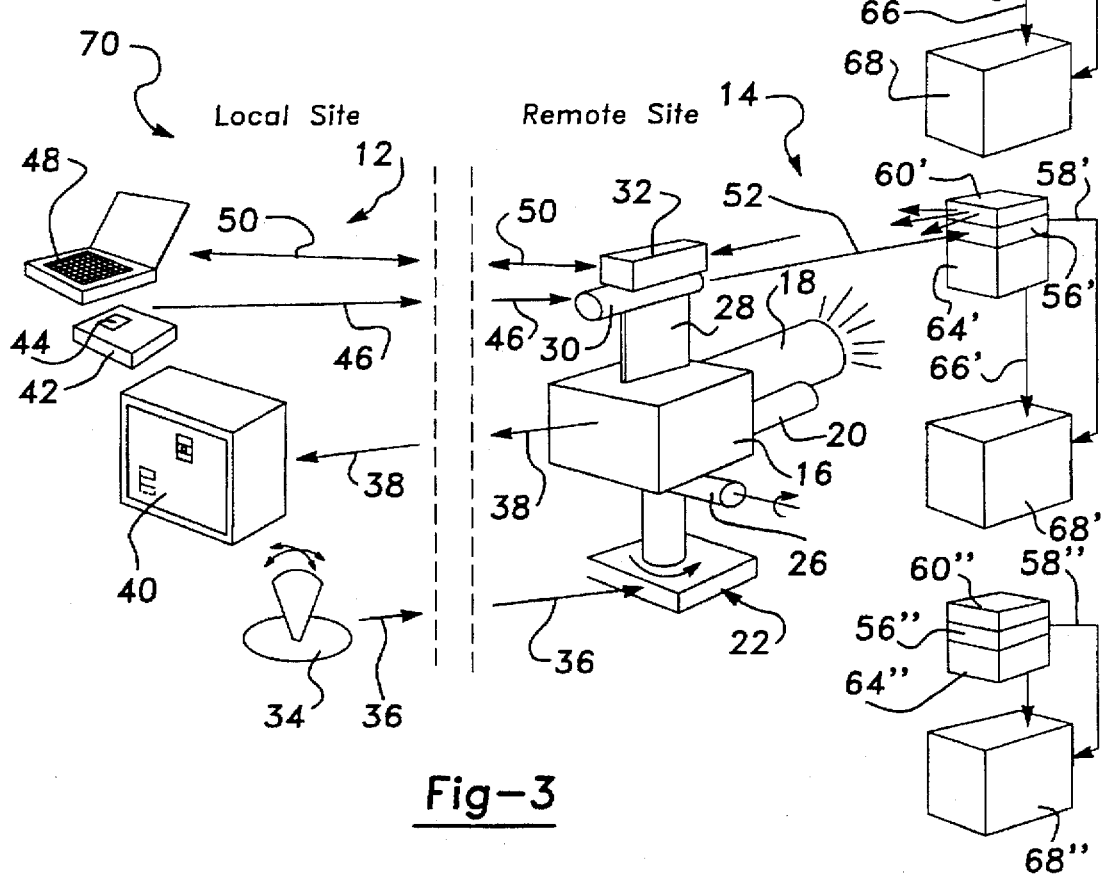
FIG. 3 depicts a visual control apparatus mechanism operable to control more than one device at the remote site.

In a second embodiment of the remote control selection, FIG. 3 depicts a remote control selection system 70. Remote control selection system 70 is configured similarly to the remote control selection system 10 of FIG. 1, but further includes a plurality of controlled devices which may be controlled from the local site 12. It should be noted that with respect to FIG. 3 and throughout this specification, like reference numerals designate like components throughout the figures and a prime (') or letter designation may be appended to a reference numeral to designate like components within the same or other drawings. Further, note that some components will only be defined in FIG. 1, but are present in the succeeding embodiments described herein, though not described.

With respect to FIG. 3, at least one of a plurality of controlled devices 68, 68', and 68" may be selected by orienting laser pointer 30 to direct the laser beam 52 at any of transponders 56, 56', or 56". When the laser beam 52 activates a transponder (56', for example), the transponder 56' generates an output signal on control line 58' which enables operation of controlled device 68' an activates device select light 60'. When actuated, transponder 56' also provides an enable signal to control receiver 64' which receives electromagnetic control signals output by control transmitter 32. The control receiver 64' receives the electromagnetic control signals, decodes the control signals, and provides control signals to controlled device 68' on control line 66'. It will be understood by one skilled in the art that the operator may direct laser beam 52 to transponder 56 or 56" to effect operation of controlled devices 68 and 68", respectively. Operation of the controlled devices 68' and 68" occurs similarly as described with respect to controlled device 68'.

With respect to FIGS. 1 and 3, it will be understood by one skilled in the art that the remote control selection systems 10 and 70 may be simplified to mere selection systems in which the laser pointer 30 directs laser beam 52 to select a particular device to be controlled from the local site 12. For example, in remote control systems in which mere selection is required for actuation and no control commands need be transmitted, remote controller 48, control transmitter 32, and control receiver 64 may be eliminated to provide a simple, less expensive system in which only selection and actuation are required.

Figure 4:
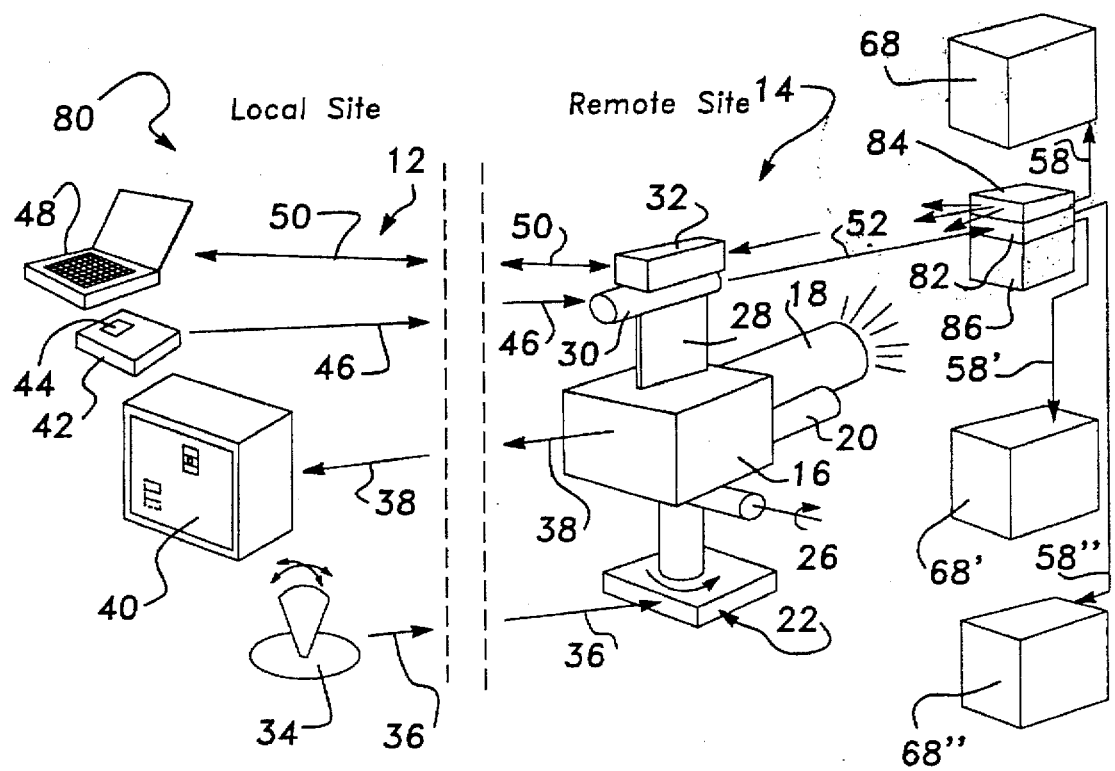
FIG. 4 depicts a visual control apparatus having one transponder for selecting one of a plurality of devices to control.

Referring to FIG. 4, yet another embodiment of the invention is disclosed in remote control selection system 80. Local site 12 is as described with respect to FIGS. 1 and 3.

The remote site 14 is substantially as described with respect to FIGS. 1 and 3, but further includes a plurality of controlled devices 68, 68', and 68". Each of the plurality of controlled devices 68, 68', and 68" is controlled through one transponder 82. When laser pointer 30 is oriented so that laser beam 52 illuminates transponder 82, transponder 82 enables at least one of the controlled devices 68, 68', and 68". When this occurs the transponder 82 actuates device select light 84 to indicate to the operator at local site 12 that the transponder 82 has been illuminated. Through camera 16, an operator at the local site 12 can observe illumination of light 84. Once transponder 82 is selected, control receiver 86 is activated to receive input from control transmitter 32. The operator at the local site 12 generates control commands on remote controller 48 which select which of the controlled devices 68, 68', or 68" to control and a particular command to issue to the particular selected device. Controller transmitter 32 receives control signals generated by remote controller 48 and provides an electromagnetic (IR) signal received by control receiver 86. Control receiver 86 decodes the electromagnetic signal and provides output signals on at least one of the selected control lines 58, 58', or 58". Note that remote controller 48 preferable may control any of the controlled devices 68, 68', or 68" after the laser beam 52 has selected transponder 82. Transponder 84 may alternatively include a sensor for each controlled device which it operated or may determine the controlled device to operate in accordance with a predetermined illumination scheme.

Figure 5A:
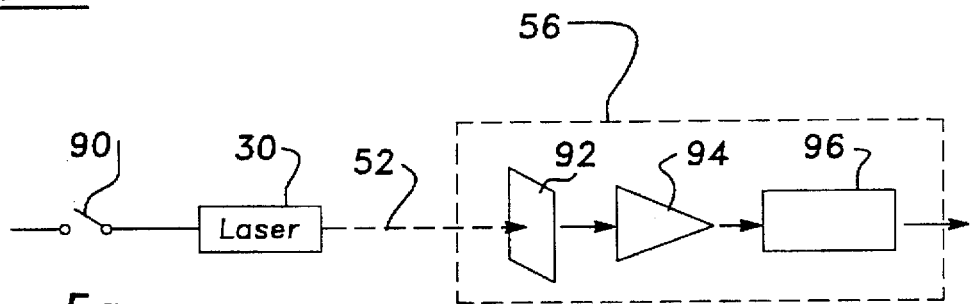
FIGS. 5a, 5b, and 5c depict different filtering schemes to limit transient light energy from inadvertently activating a selectable device.
Figure 5B:
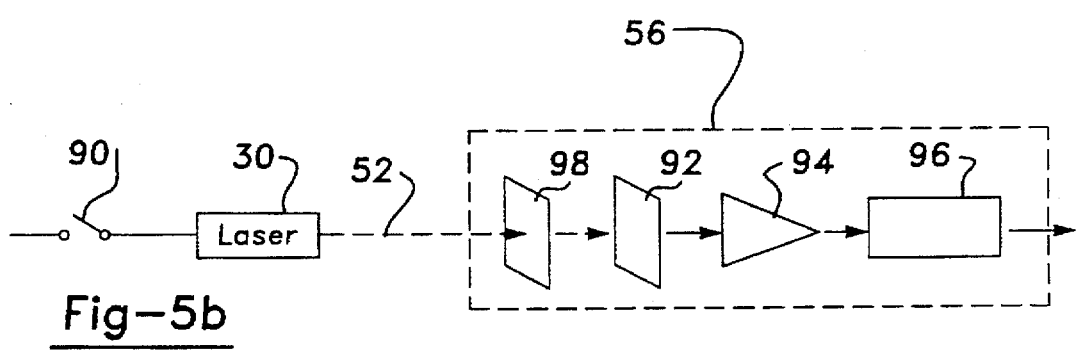
Figure 5C:
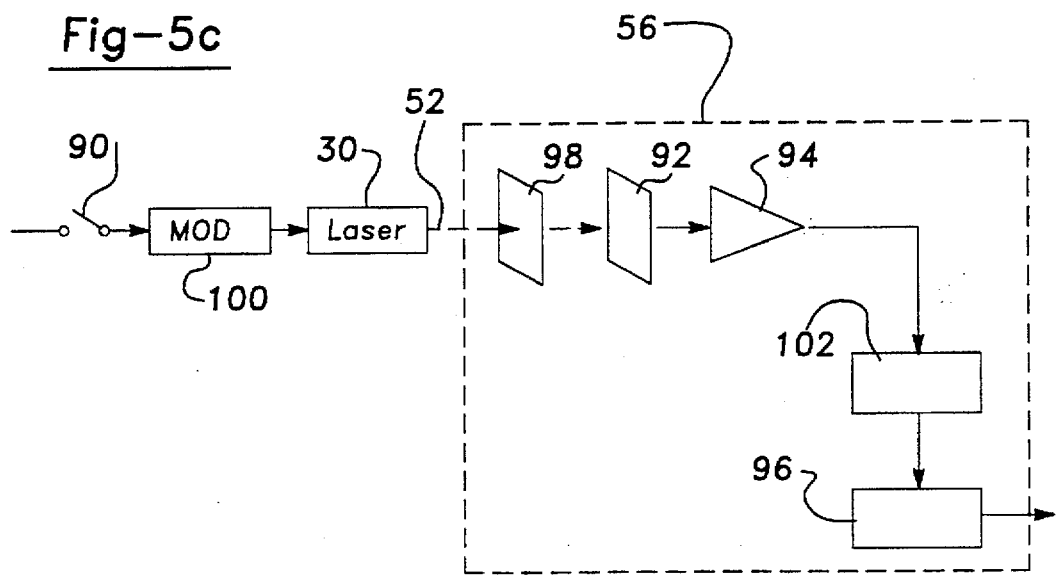

In the embodiments of FIGS. 1-4, the transponders have been assumed to operate only in response to illumination by the laser beam 52. However, in some environments, transient light could falsely activate the transponder. It is thus preferable in some instances to filter light input to the transponders. FIGS. 5a–5c depict various embodiments for filtering light input to a transponder (56, for example). Referring to FIG. 5a, the laser pointer 30 receives an electrical signal in accordance with the position of toggle switch 44 of FIGS. 1-4. The electrical signal determines actuation of switch 90. A first signal level opens switch 90, and a second signal level closes switch 90. When switch 90 is closed the laser pointer 30 produces a laser beam 52 for detection by transponder 56. The transponder 56 of FIG. 5a includes a photo-detector 92 which outputs a signal to amplifier 94 in response to the detection of light. Amplifier 94 amplifies and otherwise conditions the signal. The output from amplifier 94 is then input to threshold detector 96. When the intensity of the signal detected by photo-detector 92 exceeds a predetermined value, threshold detector 96 outputs an enable signal to the controlled device 68 (not shown in FIG. 5a).

While the configuration of FIG. 5a operates sufficiently to detect the laser beam 52, an improved configuration depicted in FIG. 5b provides more robust light detection and substantially reduces the detection of transient light which may falsely activate transponder 56. The apparatus of FIG. 5b operates similarly to the apparatus described in FIG. 5a. The transponder 56 of FIG. 5b further includes a filter 98 inserted before photo-detector 92. Filter 98 narrows the bandwidth of light incident on photo-detector 92 to the frequency of laser pointer 30. In this manner, the filter 98 limits light incident upon photo-detector 92 substantially to light of the frequency of laser pointer 30.

FIG. 5c depicts the use of a modulator 100 to modulate the output of laser 30 and provided added security against undesired actuation of transponder 56. A modulator 100 modulates the laser beam 52 output by laser pointer 30 so that the transponder 56 is actuated only in response to receipt of a modulated laser beam. Modulator 100 provides a modulation signal to laser pointer 30 which in turn outputs a modulated laser beam 52 in accordance with the modulation signal output by modulator 100. The modulator 100 includes an internal waveform generator to provide a signal envelope for controlling modulation of the laser beam 52. Common examples of such modulation include amplitude modulation (AM) or pulse code modulation (PCM). In addition to the above described modulation, the transponder 56 of FIG. 5c also includes a filter 98 for limiting the transient light incident upon the photo-detector 92 to light at the frequency of the laser beam 52.

In operation with a modulated signal, the modulated laser beam 52 strikes photo-detector 92 causing photo-detector 92 to output a signal to amplifier 94. Amplifier 94 in turn outputs an amplified signal to a second filter 102. Filter 102 is tuned to pass primarily signals at the carrier or modulation frequency of modulator 100 or a pulse code in accordance with the particular manner of modulation. Thus, only lasers having the properly modulated signal will yield input to threshold detector 96. Threshold detector 96 outputs an enable signal upon the receipt of a proper level of output signal from filter 102.

Figure 6:
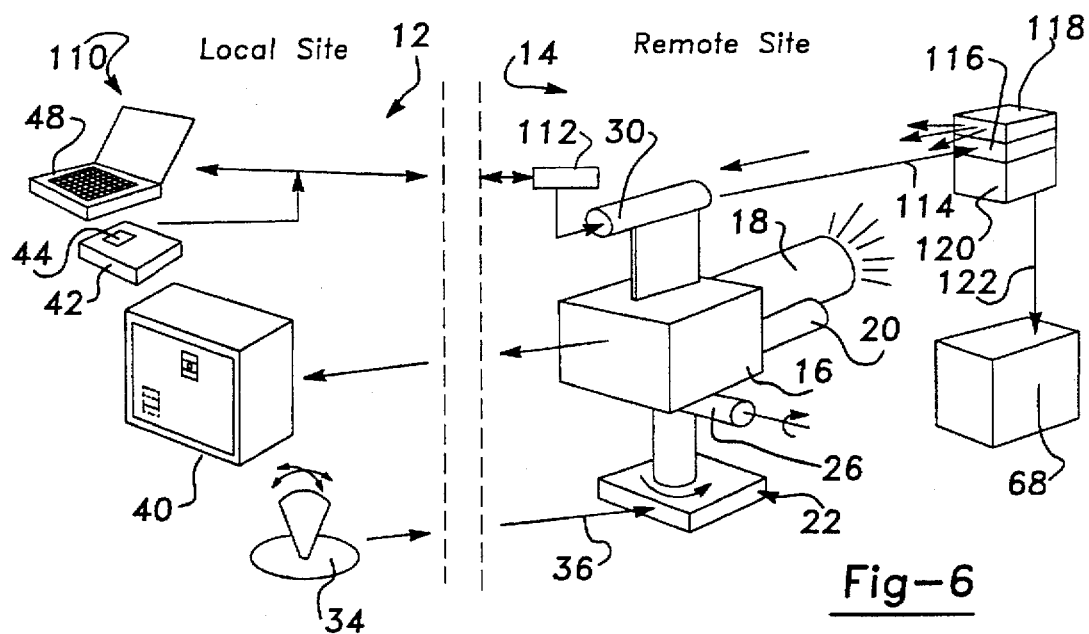
FIG. 6 depicts a visual control apparatus having a modulator for modulating the laser beam so that control commands may be encoded through modulation of the laser beam.

FIG. 6 presents an additional manner of exploiting the laser beam following selection of a particular device. Whereas in FIG. 5c modulation provides security against false actuation, modulation as described with respect to FIG. 6 provides security and enables the transmission of data and commands from the local site controller to the selected device using modulation of the laser beam. A modulator 112 receives control input from toggle switch 44 and remote controller 48. Toggle switch 44 provides a signal which activates and deactivates laser pointer 30, and may optionally operate laser pointer 30 directly. Remote controller 48 provides a signal to modulator 112 having control information which modulator 112 encodes into a format which may be read and interpreted by demodulator 120. Examples of modulation schemes for transmitting data and control commands from the remote site to the selected device include pulse code modulation (PCM), pulse position modulation (PDM), and pulse duration modulation (PDM). When the modulated laser beam 114 strikes transponder 116, transponder 116 illuminates device select light 118, indicating that the transponder 116 has been enabled. Transponder 116 outputs the modulated signal to demodulator 120 which demodulates the signals and provides a control input to controlled device 68 on signal line 122. In addition to transmitting data to the controlled device through the modulated laser beam 114, the modulator 112 may further employ AM or other modulation to guard against transient light inadvertently activating a transponder. FIG. 6 provides the additional advantage that the laser pointer 30 not only selects specific devices, but also provides control input encoded in the laser beam 114 using an encoding scheme.

Figure 7:
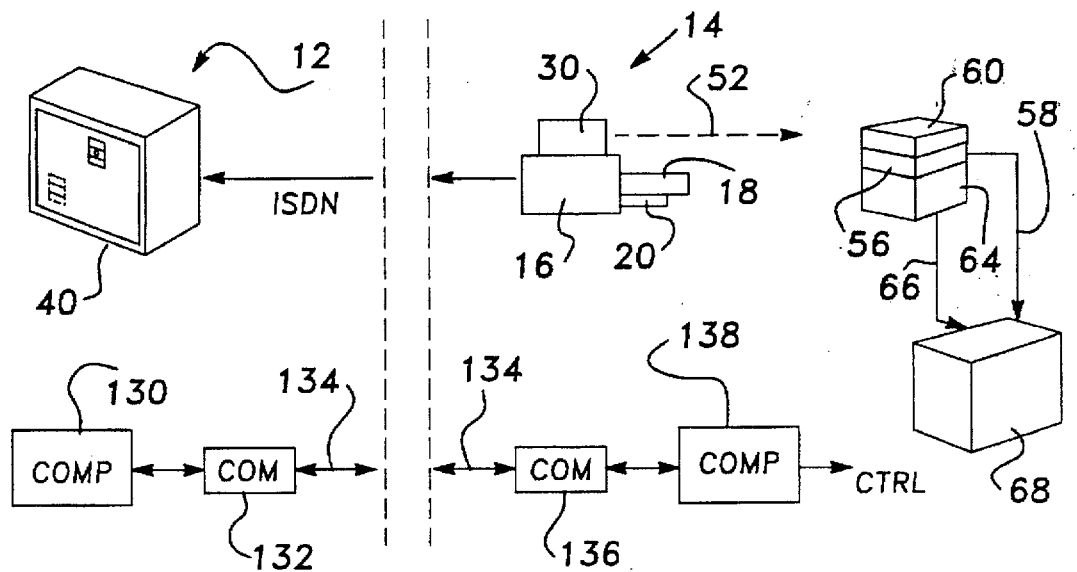
FIG. 7 depicts a visual control selection mechanism in which a computer provides control information to the remotely selected device.

FIG. 7 depicts yet another embodiment for providing control signals from local site 12 to remote site 14. In FIG. 7, the monitor 40 at the local site 12 receives video signals from the camera 16 over a video link, such as an Integrated Services Digital Network (ISDN) video link. A computer 130 generates control commands for operating a controlled device (not shown in FIG. 7). The computer 130 outputs control command via a standard telephone link. The control commands are output to a modem 132 which is connected to a phone line 134. At the remote site 14, a second modem 136 receives the signal over the telephone link from the local site 12 and converts signal back to the control commands for input to the computer 138. Computer 138 decodes the input signal at the remote site 14 and generates a control signal for directing the selected controlled device 68 to perform specific operations.

Figure 8:
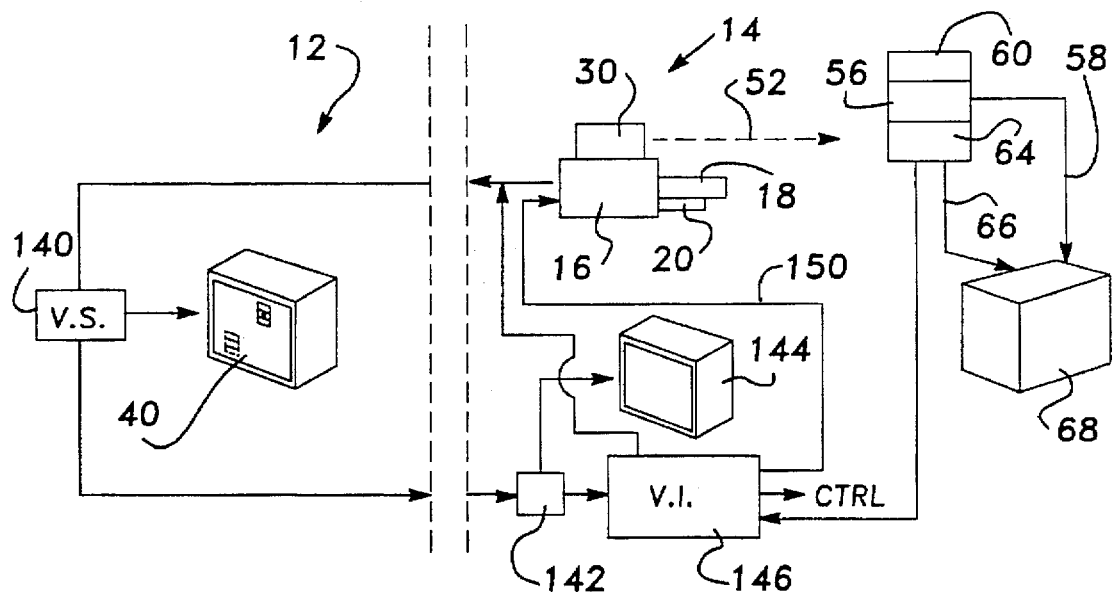
FIG. 8 depicts a visual control selection mechanism in which control information may be encoded in a visual information stream.

In yet another embodiment for providing control commands to the remote site 14 from local site 12, FIG. 8 depicts an embodiment in which a visual interpreter as described in U.S. Ser. No. 08/404,886 decodes control command to operate devices at the remote site 14. Such a configuration is particularly applicable where two-way video communication using ISDN, cable television (CTV) or the like is employed. The incoming video signal received from remote site 14 is input to the visual signaller 140. The operator uses visual signaler 140 to overlay control commands onto the incoming video signal. The overlaid control commands are then output to the monitor 40 and to the remote site 14 via the two-way video communication link. The signal received back at the remote site 14 is input to a splitter 142 which splits the signal for output to remote monitor 144 and to a visual interpreter 146. Visual interpreter 146 then decodes the command overlaid onto the video signal by visual signaler 140 and outputs the appropriate control signal to operate the controlled device (not shown in FIG. 8) as selected using laser pointer 30. Operation of the visual signaler 140 and visual interpreter 146 is as described in U.S. Ser. No. 08/404,886.

The visual interpreter 146 decodes the commands overlaid onto the video signal and outputs control signals for operating the controlled device 68. The control signals may be either hard wired to the controlled device or alternatively may be transmitted electromagnetically. The commands are received and decoded by a control receiver 64 and input to controlled device 68. In the embodiment of FIG. 8, the visual interpreter 146 may further decode the overlaid video signal and generate control commands output on control line 150 and input to camera 16 to control the pan, tilt, and zoom of the camera 16. Further, once a particular transponder 56 is selected, control receiver 64 may output a signal received by visual interpreter 146. The control signal received by visual interpreter 146 provides the visual interpreter 146 with information regarding a menu of available commands for controlling the controlled device. Visual interpreter 146 outputs this menu of available commands on the video signal output by remote site 14. The menu is then interpreted by the visual signaler 140 and provides the operator with the available menu of commands.

From the foregoing, it can be seen that use of a pointing device in a remote site to select particular devices for control from a local site provides the advantage that particular devices may be selected relatively easily, in both digital and analog video applications. Thus, the operator may freely explore the remote environment to observe which devices are available for control, and select particular devices to exercise said control. Further, in more sophisticated implementations, the selected device can provide feedback information to be overlaid onto the video signal returned to the local site indicating an available menu of commands for selection by the user. The user may then select among these command to control the remotely located device by using an iconic pointer at remote site.

While the above detailed description describes the preferred embodiment of the present invention, it will be understood that the present invention is susceptible to modification, variation and alteration without deviating from the scope and fair meaning of the subjoined claims.

We claim:

1. A telecommunications system in which video images originate at a remote site and are displayed at a local site, and the remote site includes at least one device which may be selected by an operator at the local site, a system for selecting at least one of the devices at the remote site, comprising:

- a camera at the remote site where the camera may be oriented in a plurality of positions in accordance with control commands originating at the local site;
- a pointing device which projects a focused electromagnetic signal, the pointing device moving in accordance with the camera, and the focused electromagnetic signal also providing a visual indication of the orientation of the pointing device, the camera detecting the visual indication so that the operator can determine the orientation of the pointing device;
- a signal receiver for detecting the focused electromagnetic signal when directed thereon and for generating an activation signal in response to detecting the electromagnetic signal; and
- a controlled device associated with the signal receiver and actuated in accordance with the activation signal, the controlled device being at least one of the devices, wherein the operator selects the controlled device by directing the focused electromagnetic signal on the signal receiver.

2. The apparatus as defined in claim 1 wherein the pointing device comprises a laser which emits an electromagnetic signal in the form of a laser beam.

3. The apparatus as defined in claim 1 further comprising:
- a transmitter for emitting electromagnetic control commands, the transmitter moving in accordance with the camera and receiving control information from the local site, the control information input commands directing operation of the controlled device; and
- a control receiver for receiving and decoding the electromagnetic control commands, the decoded control commands operating the controlled device.

4. The apparatus as defined in claim 3 wherein the control commands transmitted by the transmitter defines input commands selected by the operator for operating the controlled device.

5. The apparatus as defined in claim 3 wherein the transmitter emits electromagnetic control commands to operate a plurality of controlled devices.

6. The apparatus as defined in claim 5 further comprising a plurality of control receivers, each control receiver being associated with at least one of the devices.

7. The apparatus as defined in claim 3 wherein a single control receiver receives and decodes the electromagnetic control commands for individually operating a plurality of controlled devices.

8. The apparatus as defined in claim 1 further comprising a plurality of signal receivers for detecting the focused electromagnetic signal when directed thereon, each receiver being associated with one of the plurality of devices.

9. The apparatus as defined in claim 1 further comprising:
- a laser which emits an electromagnetic signal in the form of a laser beam, the laser emitting the electromagnetic signal in response to a driving signal;
- a modulator for modulating a driving signal to vary emission of the laser beam, resulting in a modulated signal output by the laser; and
- a control receiver for receiving and decoding the modulated laser beam into control commands for operating the controlled device.

10. The apparatus as defined in claim 9 further comprising a controller located at the local site for generating modulation commands to operate the modulator to provide the modulated driving signal.

11. The apparatus as defined in claim 1 further comprising:
- means for operating the controlled device, where the operating means outputs commands to the controlled device;
- a local controller at the local site to generate instructions to the means for operating the controlled device;
- a modem at the local site for transmitting the instructions to the remote site; and
- a modem at the remote site for receiving the instructions transmitted from the local site, the modem providing the instructions to the means for operating the controlled device.

12. The apparatus as defined in claim 2 further comprising:
- a visual signaller for receiving the incoming video signal from the remote site, the visual signaller operable to overlay visual command information onto the incoming video signal and operable to output an outgoing video signal for transmission to the remote site, the visual command information being visually interpretable by a user at the local or remote site; and
- a visual interpreter for decoding the overlaid video signal in order to determine the visual command information overlaid onto the incoming video signal and for outputting the decoded visual command information to at least one of the camera and the controlled device.

13. An apparatus for enabling selection of devices at a remote site from a local site in a telecommunications system, comprising:
- a camera for capturing video images at the remote site;
- a laser adapted to move in accordance with the camera, the laser projecting a focused laser beam which illuminates objects when directed thereon, and the camera detects illumination of the selected object;
- a detector which is enabled and disabled in response to illumination by the laser beam, the detector providing at least one output signal in accordance with being enabled and disabled; and
- at least one device connected to the detector receiving the detector output signal, the output signal activating and deactivating the device in accordance with the detector being enabled and disabled.

14. The apparatus as defined in claim 13 further comprising a signal light associated with the detector and activated and deactivated in accordance with illumination of the detector by the laser beam, the signal light providing an indication to the user that the detector has been detected.

15. The apparatus as defined in claim 13 further comprising a device controller associated with the detector and the controlled device, the device controller being activated in accordance with illumination of the detector by the laser beam, the device controller further sending control commands to the controlled device to operate the controlled device.

16. The apparatus as defined in claim 13 further comprising a transmitter for emitting an electromagnetic signal to the device controller which receives the electromagnetic signal, the electromagnetic signal having encoded therein control commands for decoding and operation of the controlled device.

* * * * *